US012502947B2

(12) United States Patent
Hirase et al.

(10) Patent No.: US 12,502,947 B2
(45) Date of Patent: Dec. 23, 2025

(54) WORK VEHICLE

(71) Applicant: KUBOTA CORPORATION, Osaka (JP)

(72) Inventors: Yuji Hirase, Osaka (JP); Sumio Yagyu, Osaka (JP); Kazuto Okazaki, Osaka (JP); Tsunehiro II, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 323 days.

(21) Appl. No.: 18/131,017

(22) Filed: Apr. 5, 2023

(65) Prior Publication Data

US 2023/0391182 A1     Dec. 7, 2023

(30) Foreign Application Priority Data

Jun. 3, 2022    (JP) ................................ 2022-090764

(51) Int. Cl.
*B60K 11/02*       (2006.01)
*B60K 6/40*        (2007.10)

(52) U.S. Cl.
CPC .............. *B60K 11/02* (2013.01); *B60K 6/40* (2013.01); *B60Y 2200/221* (2013.01)

(58) Field of Classification Search
CPC ........................ B62D 33/0617; B62D 33/0604; B62D 49/06; B60L 50/66; B60H 1/00278; B60H 1/00564; B60K 11/02; B60K 11/04; B60K 1/02; B60K 6/40; H05K 7/20927; F01P 3/12; F01P 3/20; H02K 9/19
See application file for complete search history.

(56) References Cited

U.S. PATENT DOCUMENTS

| | | | | |
|---|---|---|---|---|
| 9,045,028 | B2* | 6/2015 | Ichikawa | ................... B60L 1/08 |
| 9,482,321 | B2* | 11/2016 | Park | ....................... B60K 6/445 |
| 10,232,699 | B2* | 3/2019 | Oyama | .................... B60K 6/26 |
| 10,272,774 | B2* | 4/2019 | Hashimoto | ............ B60K 23/08 |
| 10,960,752 | B2* | 3/2021 | Takeno | .................... B60K 1/00 |
| 12,240,289 | B2* | 3/2025 | Eser | .................. B60H 1/00278 |

(Continued)

FOREIGN PATENT DOCUMENTS

DE     10 2019 214 079     3/2021
DE     10 2019 214079 A1     3/2021

(Continued)

OTHER PUBLICATIONS

Office Action issued Oct. 6, 2023 in corresponding family member application No. 23167864.0.

(Continued)

*Primary Examiner* — John D Walters
(74) *Attorney, Agent, or Firm* — Greenblum & Bernstein, P.L.C.

(57) ABSTRACT

A work vehicle includes: a travel device; a battery; a motor configured to supply motive power to the travel device; an inverter configured to enable the motor to operate; a first storage section configured to store a first coolant; and a second storage section configured to store a second coolant. The first coolant in the first storage section is supplied to the motor by the first pump, and returns from the motor to the first storage section, and the second coolant in the second storage section is supplied to the inverter by the second pump, and returns from the inverter to the second storage section.

8 Claims, 5 Drawing Sheets

(56) References Cited

U.S. PATENT DOCUMENTS

| | | | | |
|---|---|---|---|---|
| 2012/0186391 A1* | 7/2012 | Boskovitch | ............ | B60K 6/46 180/65.245 |
| 2016/0052379 A1 | 2/2016 | Inoue et al. | | |
| 2016/0168821 A1 | 6/2016 | Naito | | |
| 2022/0314733 A1 | 10/2022 | Eser et al. | | |

FOREIGN PATENT DOCUMENTS

| | | |
|---|---|---|
| DE | 10 2020 215 827 | 6/2021 |
| EP | 3 517 335 | 7/2019 |
| EP | 517 335 A1 | 7/2019 |
| JP | 2014-65349 A | 4/2014 |
| JP | 2014-73802 | 4/2014 |
| JP | 2014-184924 | 10/2014 |
| JP | 2015-77090 | 4/2015 |
| JP | 2017-163683 | 9/2017 |
| WO | 2015/019715 | 2/2015 |

OTHER PUBLICATIONS

Japan Office Action conducted in counterpart Japan Appln. No. 2022-090764 (May 2, 2025).
Europe Office Action conducted in counterpart Europe Appln. No. 23 167 864.0 (Apr. 10, 2025).

* cited by examiner

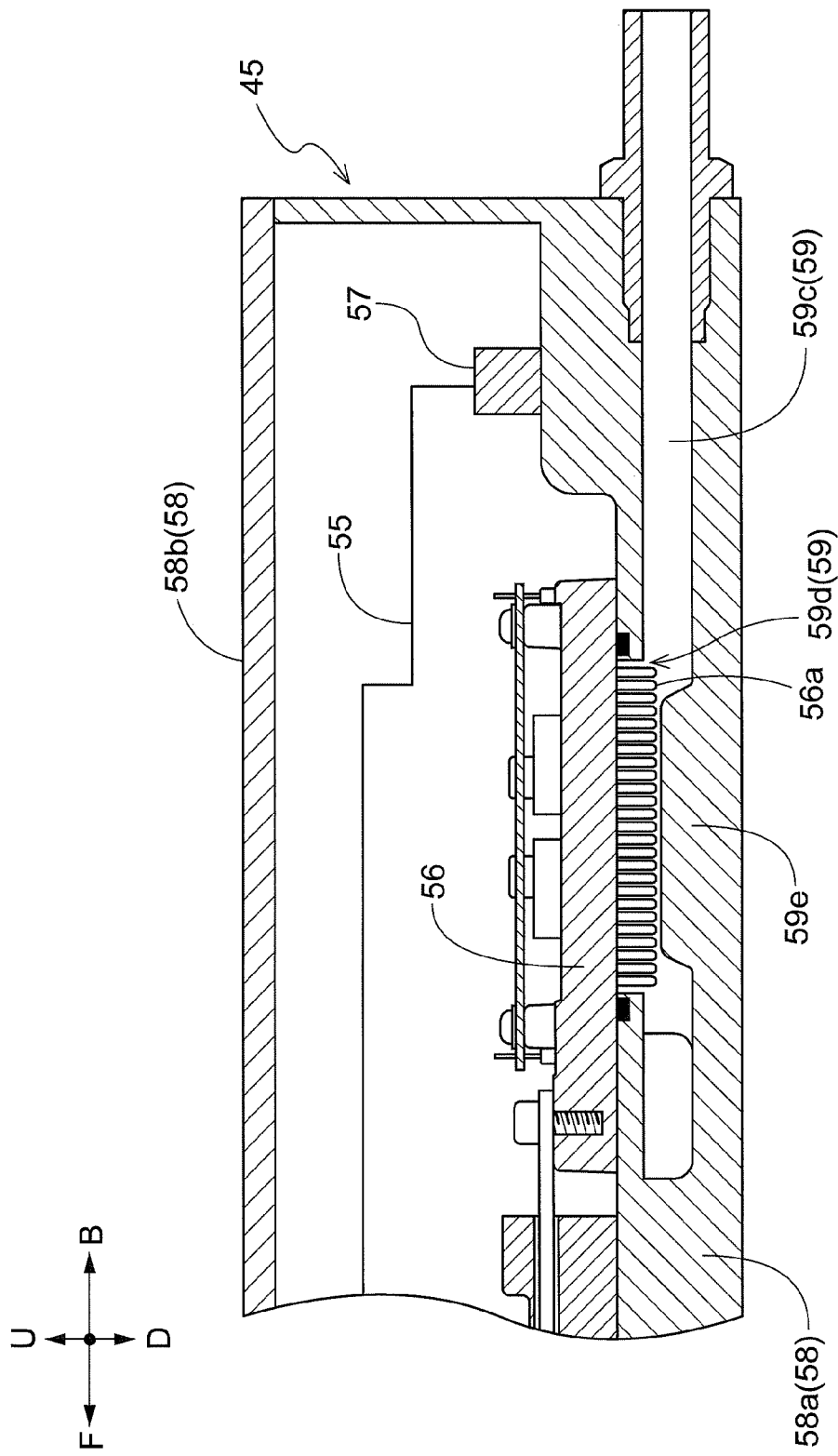

WORK VEHICLE

BACKGROUND OF THE INVENTION

1. Field of the Invention

The present invention relates to the configuration of a travel drive system in a work vehicle.

2. Description of the Related Art

As disclosed in JP 2014-65349A, some tractors, which are an example of a work vehicle, include a motor and a battery that supply motive power to a travel device.

SUMMARY OF THE INVENTION

In the case where a tractor is provided with a motor that supplies motive power to the travel device as described above, it is necessary to cool the motor, and it is also necessary to cool an inverter that operates the motor. An object of the present invention is to enable efficiently performing motor cooling and inverter cooling in a work vehicle provided with a motor that supplies motive power to a travel device.

A work vehicle according to an aspect of the present invention includes:
- a travel device;
- a battery;
- a motor configured to supply motive power to the travel device;
- an inverter configured to enable the motor to operate;
- a first storage section configured to store a first coolant; and
- a second storage section configured to store a second coolant, wherein
- the first coolant in the first storage section is supplied to the motor by the first pump, and returns from the motor to the first storage section, and
- the second coolant in the second storage section is supplied to the inverter by the second pump, and returns from the inverter to the second storage section.

The motor that supplies motive power to the travel device is generally more likely to reach a high temperate than the inverter due to being subjected to the load of traveling, and thus a relatively large difference arises between the temperatures of the motor and the inverter.

According to the present invention, the first storage section stores the first coolant, the second storage section stores the second coolant, the first coolant in the first storage section is supplied to the motor by the first pump and returns to the first storage section, and the second coolant in the second storage section is supplied to the inverter by the second pump and returns to the second storage section.

According to the present invention, the first coolant for cooling the motor and the second coolant for cooling the inverter are provided separately, thus making it possible to use the first coolant that is preferable for the motor that reaches a relatively high temperature, and making it possible to use the second coolant that is preferable for the inverter that remains at a lower temperature than the motor. Accordingly, the motor (first coolant) and the inverter (second coolant) do not affect each other, and the cooling of the motor and the cooling of the inverter can both be performed efficiently.

In the present invention, it is preferable that the first coolant is cooling oil, and the second coolant is cooling water.

According to the present invention, cooling oil preferable for the motor that reaches a relatively high temperature is used as the first coolant, and cooling water preferable for the inverter that remains at a lower temperature than the motor is used as the second coolant, and this is advantageous in that the cooling of the motor and the cooling of the inverter can both be performed efficiently.

In the present invention, it is preferable that the work vehicle further includes: a cooling section configured to cool the cooling oil in a first supply system in which the cooling oil in the first storage section is supplied from the first pump to the motor; and a radiator configured to cool the cooling water in a second supply system in which the cooling water in the second storage section is supplied from the second pump to the inverter.

According to the present invention, the cooling oil is cooled by the cooling section, and the cooled cooling oil is supplied to the motor, which is advantageous in terms of cooling the motor.

According to the present invention, the cooling water is cooled by the radiator, and the cooled cooling water is supplied to the inverter, which is advantageous in terms of cooling the inverter.

In the present invention, it is preferable that the cooling section includes a heat exchanger extending across the first supply system and the second supply system, and the heat exchanger is configured to perform heat exchange between the cooling oil and the cooling water.

According to the present invention, in the heat exchanger, heat is exchanged between the cooling oil of the first supply system and the cooling water of the second supply system, heat of cooling oil in the first supply system is absorbed by cooling water in the second supply system, thus lowering the temperature of the cooling oil in the first supply system (or heat of cooling water in the second supply system is absorbed by cooling oil in the first supply system, thus lowering the temperature of the cooling water in the second supply system), and this is advantageous in that the cooling of the motor and the cooling of the inverter can both be performed efficiently.

In the case where an oil cooler for cooling the cooling oil is provided separately from the heat exchanger, if the heat exchanger performs heat exchange between the cooling oil in the first supply system and the cooling water in the second supply system, the load applied to the oil cooler can be reduced, thus making it possible to reduce the size of the oil cooler.

If the cooling oil can be sufficiently cooled by heat exchange between the cooling oil in the first supply system and the cooling water in the second supply system performed by the heat exchanger, an oil cooler for cooling oil does not need to be provided.

In the present invention, it is preferable that the cooling section includes an oil cooler configured to cool the cooling oil.

According to the present invention, the cooling oil is directly cooled by the oil cooler, and the cooled cooling oil is supplied to the motor, which is advantageous in terms of cooling the motor.

In the present invention, it is preferable that the work vehicle further includes: an electric transmission section housing the motor, wherein the first storage section is the electric transmission section, and the cooling oil is lubricating oil stored in the electric transmission section.

According to the present invention, lubricating oil is used as the cooling oil, and by supplying the lubricating oil to the motor, it is possible to not only cool the motor, but also lubricate the motor bearings and speed reduction gears.

According to the present invention, in the case where an electric transmission section that houses the motor is provided, the electric transmission section is used as the first storage section for storing lubricating oil, thus eliminating the need for an oil tank or the like dedicated to storing lubricating oil, and this is advantageous in terms of simplifying the structure.

In the present invention, it is preferable that the motor is a motor generator, and the work vehicle further includes: an engine separate from the motor generator; and a hybrid transmission that includes the electric transmission section and a gear transmission section provided with a gear transmission mechanism, and is configured to change a speed of motive power from the engine and output the motive power to the travel device.

According to the present invention, the motor is a motor generator, the engine is provided separately from the motor generator, and the work vehicle is provided with the hybrid transmission that includes the electric transmission section and the gear transmission section.

This is advantageous in that it is possible to efficiently perform both the cooling of the motor generator and the cooling of the inverter in a hybrid work vehicle.

In the present invention, it is preferable that the electric transmission section and the gear transmission section are partitioned from each other, and the lubricating oil stored in the electric transmission section is different from lubricating oil stored in the gear transmission section.

In the electric transmission section, it is preferable to use lubricating oil that has a relatively low viscosity so that the motor generator can be easily cooled without resistance being applied to the motor generator.

Since lubrication is given priority over cooling in the gear transmission section, it is preferable to use lubricating oil that has a relatively high viscosity so that an oil film of the lubricating oil is likely to remain on the gears of the gear transmission mechanism.

According to the present invention, the electric transmission section and the gear transmission section are partitioned from each other, and the lubricating oil stored in the electric transmission section is different from the lubricating oil stored in the gear transmission section.

Accordingly, even if lubricating oil preferable for cooling the motor generator is used in the electric transmission section and lubricating oil preferable for lubricating the gear transmission mechanism is used in the gear transmission section, the two types of lubricating oil do not mix, thus making it possible to easily maintain the performance of cooling the motor generator and the performance of lubricating the gear transmission mechanism.

If fine dust produced in the gear transmission section becomes mixed into the lubricating oil that cools the motor generator, there is a possibility of leading to damage to electrical insulation portions in the motor generator.

According to the present invention, the electric transmission section and the gear transmission section are partitioned from each other, thus suppressing the aforementioned contamination, and this is advantageous in terms of improving the durability of the motor generator.

BRIEF DESCRIPTION OF THE DRAWINGS

FIG. 5 is a vertical cross-sectional left side view of the inverter.

DETAILED DESCRIPTION OF PREFERRED EMBODIMENTS

FIGS. 1 to 5 show a tractor, which is an example of a work vehicle. In FIGS. 1 to 5, F indicates the forward direction, B indicates the rearward direction, U indicates the upward direction, D indicates the downward direction, R indicates the right direction, and L indicates the left direction.

Overall Configuration of Tractor

Figure 1:
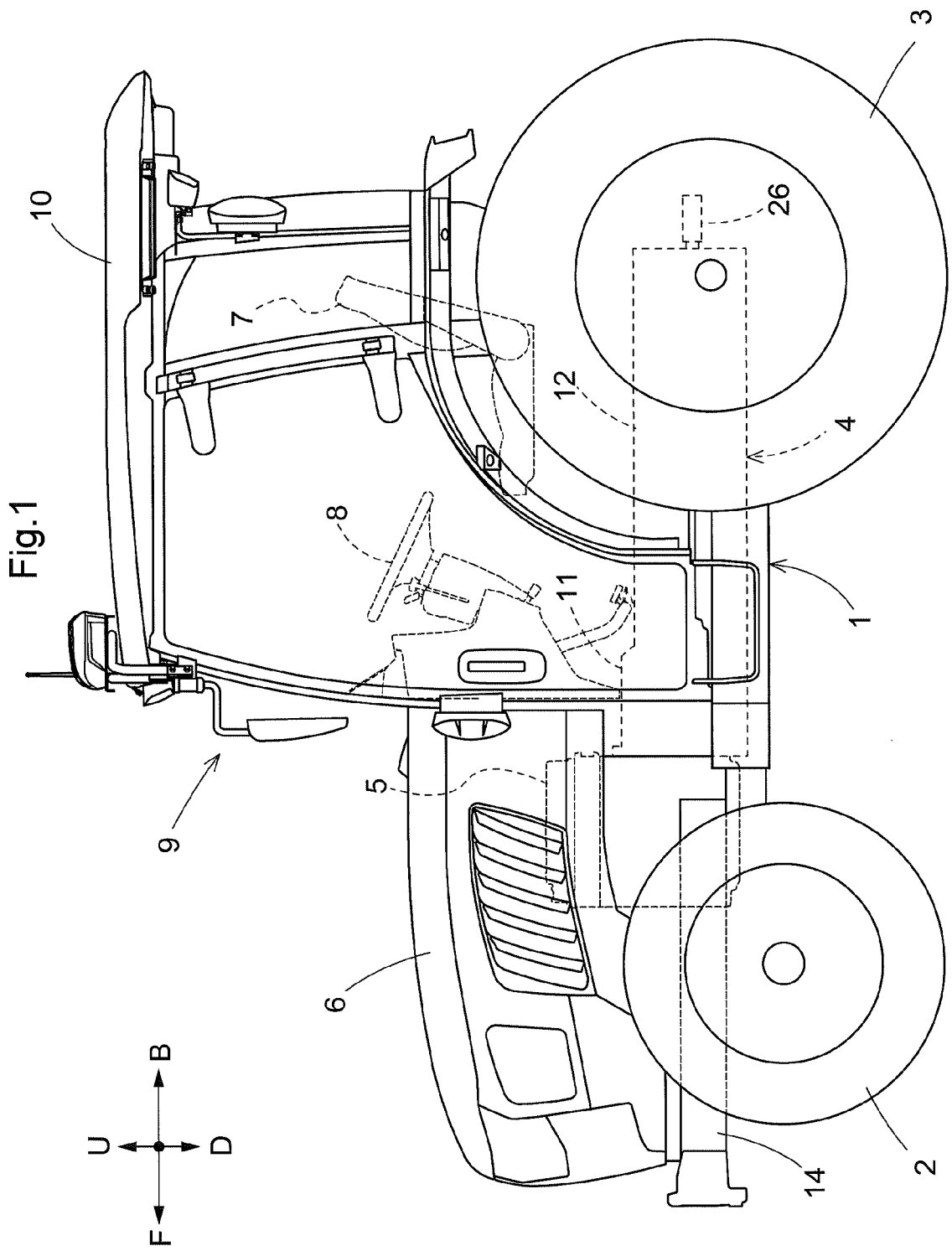
FIG. 1 is a left side view of a tractor.

As shown in FIG. 1, a body 1 is supported by right and left front wheels 2 (corresponding to travel devices) and right and left rear wheels 3 (corresponding to travel devices), a bonnet 6 is provided in a front section of the body 1, and a driving section 9 is provided in a rear section of the body 1.

The body 1 includes an engine 5, a clutch housing 11 (corresponding to an electric transmission section; corresponding to a first storage section) coupled to a rear section of the engine 5, a transmission case 12 (corresponding to a gear transmission section) coupled to a rear section of the clutch housing 11, a front frame 14 coupled to a front section of the engine 5, and the like. A hybrid transmission 4 is configured by provision of the clutch housing 11 and the transmission case 12.

The front wheels 2 are supported by the front frame 14, and the rear wheels 3 are supported by a rear section of the transmission case 12. The engine 5 is covered by the bonnet 6. The driving section 9 is covered by the cabin 10, and a driver seat 7 and a steering wheel 8 for steering the front wheels 2 are provided in the driving section 9.

Configuration of Clutch Housing

Figure 2:
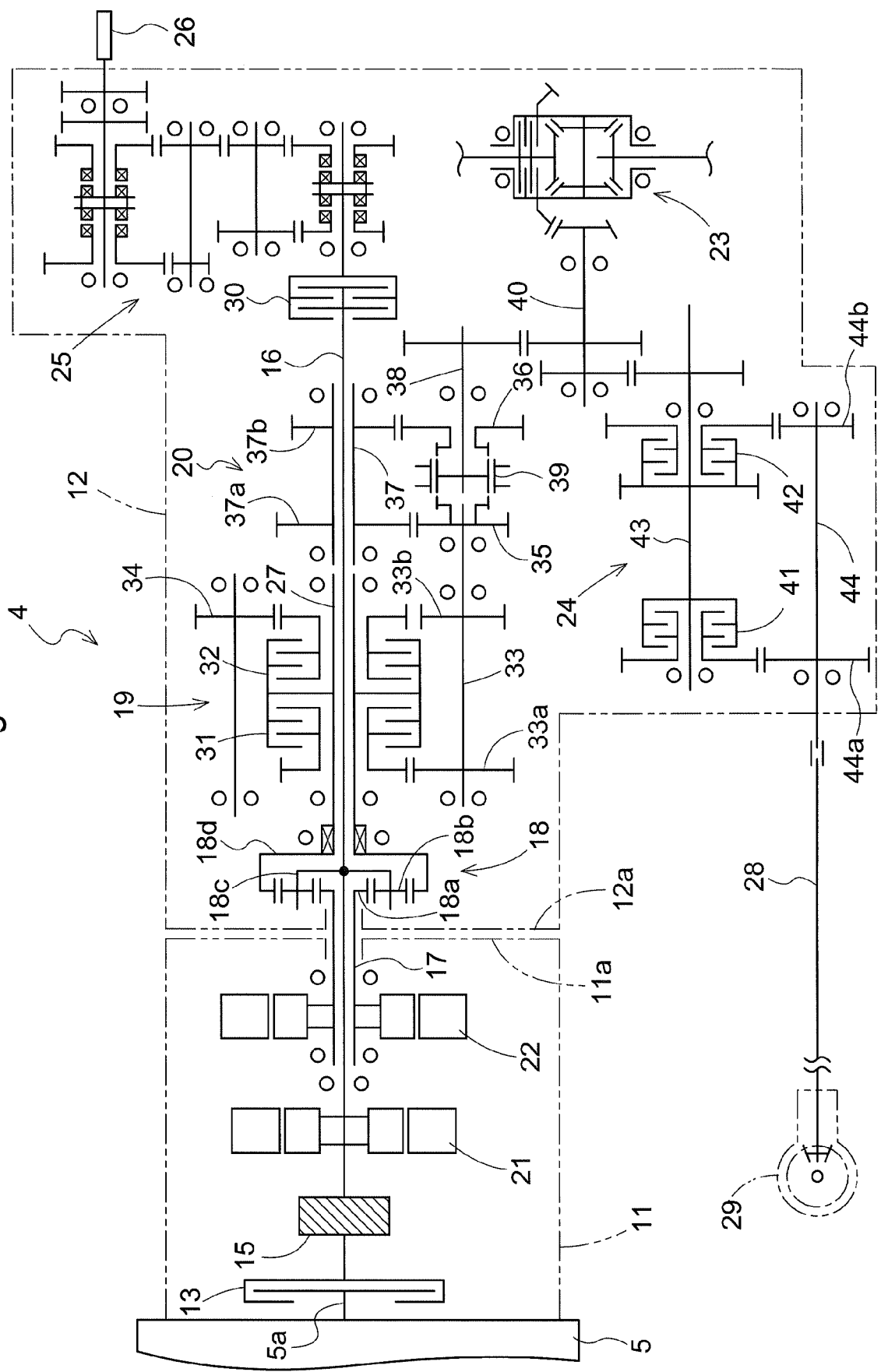
FIG. 2 is a schematic diagram showing the inside of a hybrid transmission.

As shown in FIG. 2, a clutch 13, a hydraulic pump 15 (corresponding to a first pump), a first motor generator 21 (corresponding to a motor generator; corresponding to a motor), and a second motor generator 22 (corresponding to a motor generator; corresponding to a motor) are provided inside the clutch housing 11.

The clutch 13 is connected to an output shaft 5a of the engine 5, and a transmission shaft 16 is connected to the clutch 13 and extends from the inside of the clutch housing 11 to a rear section of the inside of the transmission case 12. A cylindrical shaft 17 is rotatably attached to the transmission shaft 16 and extends from the inside of the clutch housing 11 to a front section of the inside of the transmission case 12. The hydraulic pump 15 and the first motor generator 21 are attached to the transmission shaft 16, and the second motor generator 22 is attached to the cylindrical shaft 17.

Configuration of Transmission Case

As shown in FIG. 2, a planetary device 18 (corresponding to a gear transmission mechanism), a forward/reverse switching device 19 (corresponding to a gear transmission mechanism), an auxiliary transmission (corresponding to a gear transmission mechanism), a rear wheel differential device 23 (corresponding to a gear transmission mechanism), a front wheel transmission 24 (corresponding to a gear transmission mechanism), a PTO clutch 30, a PTO transmission 25 (corresponding to a gear transmission mechanism), and a PTO shaft 26 are provided inside the transmission case 12.

Motive power generated by the engine 5 (or motive power generated by the first motor generator 21) is transmitted to the planetary device 18 and accelerated or decelerated, is then transmitted from the forward/reverse switching device 19 to the auxiliary transmission 20, and is then transmitted to the rear wheels 3 via the rear wheel differential device 23. Motive power extracted from a point just before the rear wheel differential device 23 is transmitted to the front wheel transmission 24, transmitted from a transmission shaft 28 to a front wheel differential device 29, and transmitted to the front wheels 2 via the front wheel differential device 29.

Motive power generated by the engine 5 (or motive power generated by the first motor generator 21) is transmitted via the transmission shaft 16 and the PTO clutch 30 to the PTO transmission device 25 and accelerated or decelerated therein, and then transmitted to the PTO shaft 26 provided at a rear section of the transmission case 12.

The inside of the clutch housing 11 and the inside of the transmission case 12 are partitioned by a rear wall portion 11a of the clutch housing 11 and a front wall portion 12a of the transmission case 12. The transmission shaft 16 and the cylindrical shaft 17 pass through the wall portion 11a of the clutch housing 11 and the wall portion 12a of the transmission case 12.

Configuration of Planetary Device

As shown in FIG. 2, the planetary device 18 includes a sun gear 18a, a plurality of planetary gears 18b, a carrier 18c, a ring gear 18d, and the like.

In the planetary device 18, the sun gear 18a is coupled to a cylindrical shaft 17. The carrier 18c is coupled to the transmission shaft 16, the planetary gears 18b are rotatably supported by the carrier 18c, and the sun gear 18a and the planetary gears 18b are meshed with each other. A cylindrical shaft 27 is rotatably attached to the transmission shaft 16. The ring gear 18d is coupled to the cylindrical shaft 27, and the planetary gears 18b and the ring gear 18d are meshed with each other.

Motive power generated by the engine 5 (or motive power generated by the first motor generator 21) is transmitted to the carrier 18c of the planetary device 18, and motive power generated by the second motor generator 22 is transmitted to the sun gear 18a of the planetary device 18. Motive power generated by the engine 5 (or motive power generated by the first motor generator 21) and motive power generated by the second motor generator 22 are combined and accelerated or decelerated in the planetary device 18, and the resulting motive power is transmitted from the ring gear 18d of the planetary device 18 to the cylindrical shaft 27.

Configuration of Forward/Reverse Switching Device

As shown in FIG. 2, the forward/reverse switching device 19 includes a forward clutch 31, a reverse clutch 32, a transmission shaft 33, a relay gear 34, and the like.

The forward clutch 31 and the reverse clutch 32 are attached to the cylindrical shaft 27. The transmission shaft 33 extends parallel with the cylindrical shaft 27, and transmission gears 33a and 33b are coupled to the transmission shaft 33. The output gear of the forward clutch 31 and the transmission gear 33a of the transmission shaft 33 are meshed with each other. The output gear of the reverse clutch 32 is meshed with the relay gear 34, and the relay gear 34 is meshed with the transmission gear 33b of the transmission shaft 33.

In the forward/reverse switching device 19, when the forward clutch 31 is operated to the transmission state, motive power is transmitted from the cylindrical shaft 27 to the transmission shaft 33 in a forward state via the forward clutch 31. When the reverse clutch 32 is operated to the transmission state, motive power is transmitted from the cylindrical shaft 27 to the transmission shaft 33 in a reverse state via the reverse clutch 32 and the relay gear 34.

Configuration of Auxiliary Transmission

As shown in FIG. 2, the auxiliary transmission 20 includes a high speed gear 35, a low speed gear 36, a cylindrical shaft 37, a transmission shaft 38, a shift member 39, and the like.

The high speed gear 35 is coupled to the transmission shaft 33. The cylindrical shaft 37 is rotatably attached to the transmission shaft 16, transmission gears 37a and 37b are coupled to the cylindrical shaft 37, and the high speed gear 35 and the transmission gear 37a of the cylindrical shaft 37 are meshed with each other.

The transmission shaft 38 is concentric with the transmission shaft 33 and the high speed gear 35, and the shift member 39 is provided on the transmission shaft 38. The low speed gear 36 is rotatably attached to the transmission shaft 38, and the low speed gear 36 and the transmission gear 37b of the cylindrical shaft 37 are meshed with each other.

In the auxiliary transmission 20, when the shift member 39 is slid so as to mesh with the high speed gear 35, the transmission shaft 33 and the transmission shaft 38 become coupled to each other, and motive power is transmitted from the transmission shaft 33 to the transmission shaft 38 in a high speed state. When the shift member 39 is slid so as to mesh with the low speed gear 36, motive power is transmitted from the transmission shaft 33 to the transmission shaft 38 in a low speed state via the high speed gear 35, the cylindrical shaft 37, and the low speed gear 36.

Motive power transmitted to the transmission shaft 38 is transmitted from the rear wheel output shaft 40 to the rear wheel differential device 23 and from the rear wheel differential device 23 to the rear wheels 3.

Configuration of Front Wheel Transmission

As shown in FIG. 2, the front wheel transmission 24 includes a standard clutch 41, a speed increasing clutch 42, a transmission shaft 43, a front wheel output shaft 44, and the like.

The standard clutch 41 and the speed increasing clutch 42 are attached to the transmission shaft 43, and motive power is transmitted from the rear wheel output shaft 40 to the transmission shaft 43. The front wheel output shaft 44 extends parallel with the transmission shaft 43, and transmission gears 44a and 44b are coupled to the front wheel output shaft 44. The output gear of the standard clutch 41 and the transmission gear 44a of the front wheel output shaft 44 are meshed with each other, and the output gear of the speed increasing clutch 42 and the transmission gear 44b of the front wheel output shaft 44 are meshed with each other.

When the front wheels 2 are steered from the straight ahead position to angles less than or equal to right and left set angles, the standard clutch 41 in the front wheel transmission 24 is operated to the transmission state.

Motive power is transmitted from the rear wheel output shaft 40 to the front wheel output shaft 44 via the transmission shaft 43 and the standard clutch 41, and is transmitted to the front wheels 2 via the transmission shaft 28 and the front wheel differential device 29, and thus the front wheels 2 and the rear wheels 3 are driven at the same speed.

When the front wheels 2 are steered to the left or right beyond the right and left set angles, the speed increasing clutch 42 in the front wheel transmission 24 is operated to the transmission state.

Motive power is transmitted from the rear wheel output shaft 40 to the front wheel output shaft 44 via the transmission shaft 43 and the speed increasing clutch 42, and is transmitted to the front wheels 2 via the transmission shaft 28 and the front wheel differential device 29, and thus the front wheels 2 are driven at a higher speed than the rear wheels 3.

Configurations Related to First Motor Generator and Second Motor Generator

Figure 3:
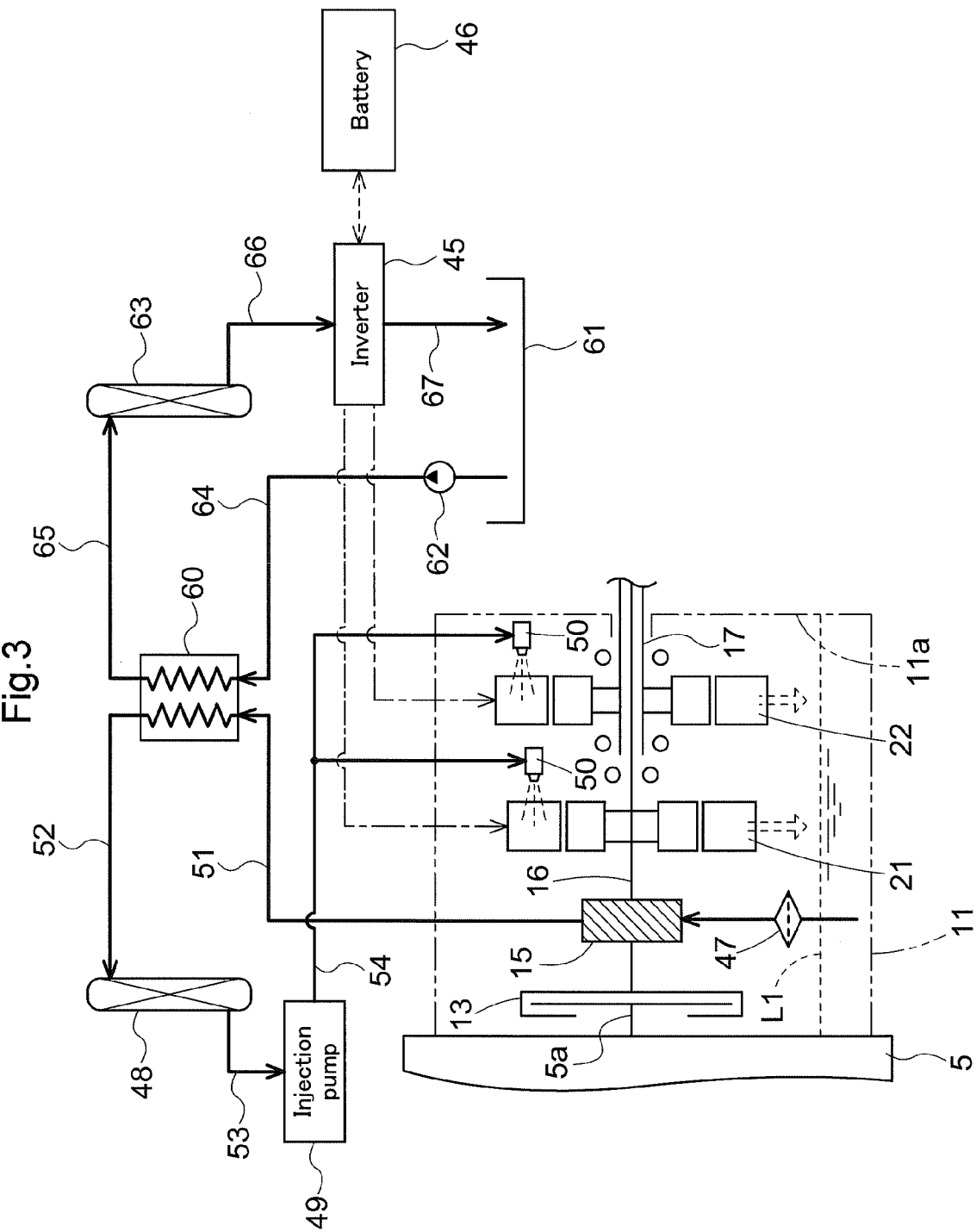
FIG. 3 is a schematic diagram showing an overview of cooling and lubrication of a first motor generator and a second motor generator, and an overview of inverter cooling.

As shown in FIGS. 2 and 3, an inverter 45 and a battery 46 are provided for the first motor generator 21 and the second motor generator 22.

In the case where the first motor generator 21 (second motor generator 22) operates as a motor and gives motive power to the transmission shaft 16 (cylindrical shaft 17), DC power generated by the battery 46 is converted into AC power by the inverter 45, which is supplied to the first motor generator 21 (second motor generator 22), and thus the first motor generator 21 (second motor generator 22) operates as a motor (driving mode).

In the case where the first motor generator 21 (second motor generator 22) is driven and operates as a generator, AC power generated by the first motor generator 21 (second motor generator 22) is converted into DC power by the inverter 45, and the battery 46 is charged with the DC power (charging mode). Note that a capacitor (not shown) may be used as the battery 46.

A control device (not shown) sets the first motor generator 21 to the charging mode or the driving mode and sets the second motor generator 22 to the charging mode or the driving mode based on the state of the work device (not shown) mounted to the machine body 1, the traveling state of the body 1, and the like.

In this case, the state in which the first motor generator 21 is set to the charging mode and the second motor generator 22 is set to the driving mode is the basic traveling state.

In the basic traveling state, motive power generated by the engine 5 is transmitted to the carrier 18*c* of the planetary device 18, motive power generated by the second motor generator 22 is transmitted to the sun gear 18*a* of the planetary device 18, and, in the planetary device 18, the motive power from the engine 5 and the motive power from the second motor generator 22 are combined and accelerated or decelerated, and the resulting motive power is transmitted from the ring gear 18*d* of the planetary device 18 to the cylindrical shaft 27.

If the clutch 13 is operated to the disengaged state, the engine 5 can be stopped and the body can travel with the first motor generator 21 and the second motor generator 22 in the driving mode.

Clutch Housing Lubricating Oil and Transmission Case Lubricating Oil

As shown in FIG. 3, lubricating oil (corresponding to a first coolant; corresponding to cooling oil) having a relatively low viscosity is stored in the bottom section of the clutch housing 11. The amount of lubricating oil is set such that an oil level L1 of the lubricating oil stored in the clutch housing 11 is low enough to not come into contact with the first motor generator 21 and the second motor generator 22.

As shown in FIG. 2, lubricating oil having a higher viscosity than the lubricating oil in the clutch housing 11 is stored in the transmission case 12. The amount of lubricating oil stored in the transmission case 12 is set such that the oil level thereof is higher than the oil level L1 of the lubricating oil in the clutch housing 11, and the transmission case 12 is in an oil-bath state.

According to the above configuration, the lubricating oil stored in the clutch housing 11 (the lubricating oil for cooling the first motor generator 21 and the second motor generator 22) and the lubricating oil stored in the transmission case 12 are set as different lubricating oils.

The inside of the clutch housing 11 and the inside of the transmission case 12 are partitioned by the rear wall portion 11*a* of the clutch housing 11 and the front wall portion 12*a* of the transmission case 12. This prevents the mixing of the lubricating oil stored in the clutch housing 11 (the lubricating oil for cooling the first motor generator 21 and the second motor generator 22) and the lubricating oil stored in the transmission case 12.

Configuration Related to Cooling and Lubrication of First Motor Generator and Second Motor Generator As shown in FIG. 3, the hydraulic pump 15, an oil cooler 48 (corresponding to a cooling section), an injection pump 49, and injection nozzles are provided for the first motor generator 21 and the second motor generator 22. A heat exchanger 60 (corresponding to a cooling section) is provided for the first motor generator 21, the second motor generator 22, and the inverter 45.

The hydraulic pump 15 is driven by the transmission shaft 16, and lubricating oil in the clutch housing 11 is sucked into the hydraulic pump 15 through a relatively fine-mesh filter 47. The lubricating oil sucked into the hydraulic pump 15 is supplied from the hydraulic pump 15 to the heat exchanger 60 via a passage 51 (corresponding to a first supply system), and is then supplied from the heat exchanger 60 to the oil cooler 48 via a passage 52 (corresponding to a first supply system) and cooled.

The lubricating oil cooled by the oil cooler 48 is then supplied to the injection pump 49 via a passage 53 (corresponding to a first supply system). A plurality of injection nozzles 50 are provided inside the clutch housing 11 so as to face various portions of the first motor generator 21 and various portions of the second motor generator 22.

The lubricating oil is then supplied from the injection pump 49 to the injection nozzles 50 via a passage 54. The lubricating oil is then supplied from the injection nozzles 50 to various portions of the first motor generator 21 and various portions of the second motor generator 22 to cool and lubricate the first motor generator 21 and the second motor generator 22.

After cooling and lubricating the first motor generator 21 and the second motor generator 22, the lubricating oil naturally falls from the first motor generator 21 and the second motor generator 22 and returns to the bottom section of the clutch housing 11.

According to the above configuration, lubricating oil (first coolant; cooling oil) in the clutch housing 11 (first storage section) is supplied by the hydraulic pump 15 (first pump) to the first motor generator 21 (motor) and the second motor generator 22 (motor), and returns from the first motor generator 21 (motor) and the second motor generator 22 (motor) to the clutch housing 11 (first storage section).

The oil cooler 48 that cools the lubricating oil (first coolant; cooling oil) is provided along the passage 51, 52, or 53 (first supply system) along which the lubricating oil (first coolant; cooling oil) in the clutch housing 11 (first storage section) is supplied by the hydraulic pump 15 (first pump) to the first motor generator 21 (motor) and the second motor generator 22 (motor).

Configuration Related to Cooling of Inverter

As shown in FIG. 3, a cooling water tank 61 (corresponding to a second storage section), a water pump 62 (corresponding to a second pump), and a radiator 63 are provided for the inverter 45. Cooling water (corresponding to a second coolant) is stored in the cooling water tank 61, and the water pump 62 is driven by motive power generated by the engine 5.

The cooling water in the cooling water tank 61 is suctioned by the water pump 62 and supplied from the water pump 62 through a passage 64 (corresponding to a second supply system) to the heat exchanger 60, and is then supplied from the heat exchanger 60 through a passage 65 (corresponding to a second supply system) to the radiator 63 and cooled.

The cooling water cooled by the radiator 63 is supplied to the inverter 45 via a passage 66 (corresponding to a second supply system) to cool the inverter 45. The cooling water that cooled the inverter 45 then returns to the cooling water tank 61 via a passage 67.

Lubricating oil in the clutch housing 11 is supplied to the heat exchanger 60 via the hydraulic pump 15 and the passage 51, and cooling water in the cooling water tank 61 is supplied to the heat exchanger 60 via the water pump 62 and the passage 64.

In the heat exchanger 60, heat is exchanged between the lubricating oil from the clutch housing 11 and the cooling water from the cooling water tank 61 (heat of lubricating oil from the clutch housing 11 is absorbed by cooling water from the cooling water tank 61, or heat of cooling water from the cooling water tank 61 is absorbed by lubricating oil from the clutch housing 11).

According to the above configuration, the cooling water (second coolant) in the cooling water tank 61 (second storage section) is supplied to the inverter by the water pump 62 (second pump), and returns from the inverter 45 to the cooling water tank 61 (second storage section).

The radiator 63 is provided to cool the cooling water (second coolant) in the passage 64, 65, or 66 (second supply system) through which the cooling water (second coolant) in the cooling water tank 61 (second storage section) is supplied from the water pump 62 (second pump) to the inverter 45.

The heat exchanger 60 is provided to perform heat exchange between the lubricating oil (first coolant; cooling oil) and the cooling water (second coolant) along the passage 51, 52, or 53 (first supply system) and the passage 64, 65, or 66 (second supply system).

The cooling section, which includes the oil cooler 48 and the heat exchanger 60, is provided as a configuration for cooling the lubricating oil (first coolant; cooling oil).

In the case of using a configuration in which the heat exchanger 60 performs heat exchange between lubricating oil from the clutch housing 11 and cooling water from the cooling water tank 61 (a configuration in which heat of the lubricating oil from the clutch housing 11 is absorbed by the cooling water from the cooling water tank 61), the size of the oil cooler 48 can be reduced. If the heat exchange described above can be performed sufficiently, the oil cooler 48 may be omitted.

Configuration of Inverter

Figure 4:
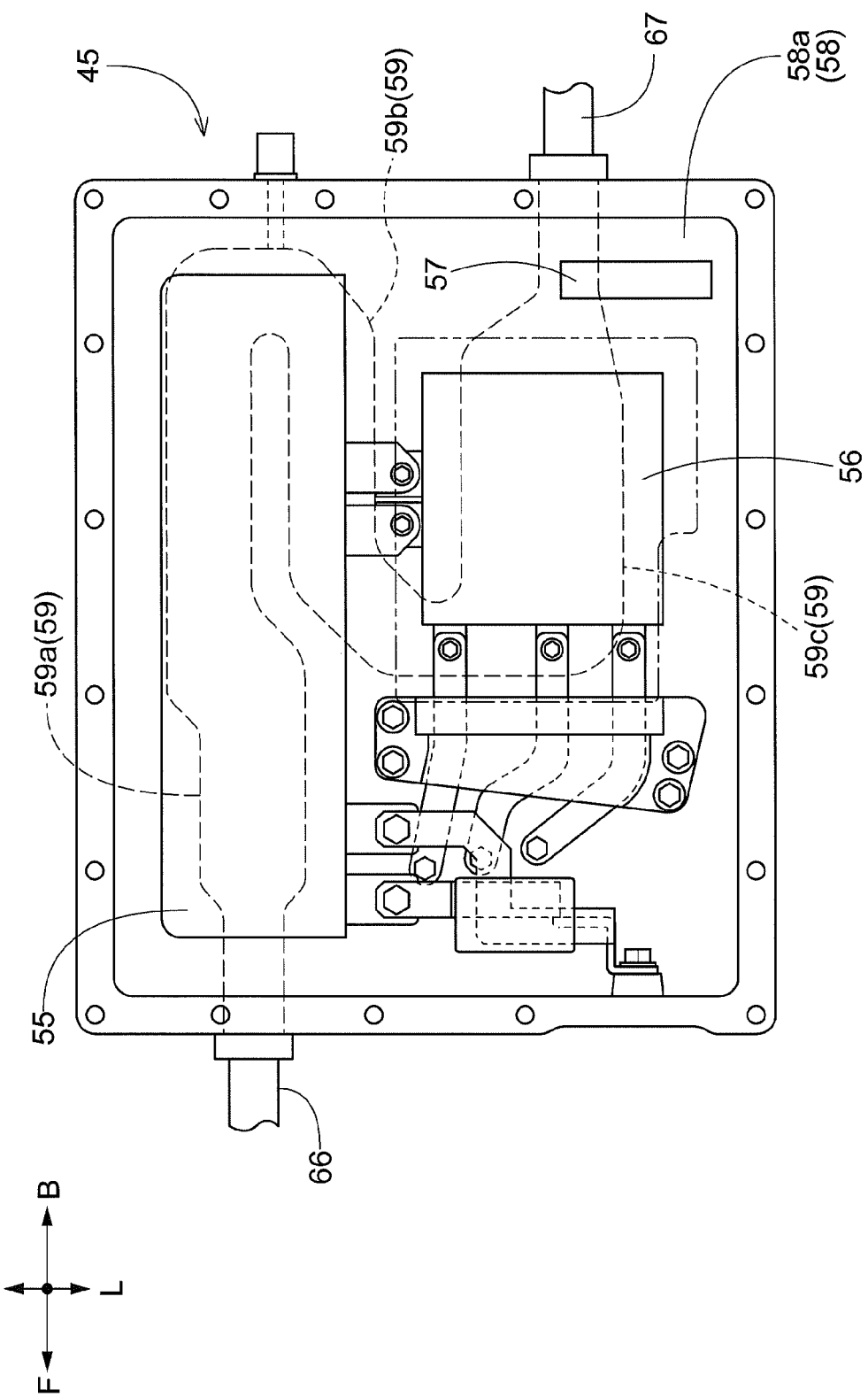
FIG. 4 is a plan view of an inverter.

As shown in FIGS. 4 and 5, the inverter 45 includes a capacitor 55, an IGBT 56, which is an example of a power transistor, a resistor 57, and the like, and further includes a case 58 that houses the capacitor 55, the IGBT 56, the resistor 57, and the like.

The case 58 includes a substrate 58a and a lid 58b. A cooling passage 59 for lubricating oil is provided inside the substrate 58a of the case 58, and the cooling passage 59 includes a first portion 59a, a second portion 59b, and a third portion 59c.

The first portion 59a of the cooling passage 59 extends rearward along the front-rear direction from the front portion of the substrate 58a of the case 58, and the passage 66 (see FIG. 3) is connected to the front of the first portion 59a of the cooling passage 59.

The second portion 59b of the cooling passage 59 extends from the rear portion of the first portion 59a of the cooling passage 59 and turns 180 degrees so as to extend forward in the front-rear direction. The third portion 59c of the cooling passage 59 extends from the front portion of the second portion 59b of the cooling passage 59 and turns 180 degrees so as to extend rearward in the front-rear direction, and the passage 67 (see FIG. 3) is connected to the rear portion of the third portion 59c of the cooling passage 59.

The capacitor 55 is attached to a portion of the substrate 58a of the case 58 that corresponds to the upper portions of the first portion 59a and the second portion 59b of the cooling passage 59. The IGBT 56 and the resistor 57 are attached to a portion of the substrate 58a of the case 58 that corresponds to the upper portion of the third portion 59c of the cooling passage 59.

As shown in FIG. 5, an opening 59d is formed in the upper portion of the third portion 59c of the cooling passage 59, and the IGBT 56 is provided in the opening 59d of the cooling passage 59. A large number of pin fins 56a (heat sinks) are provided on the lower portion of the IGBT 56 and face downward, and the pin fins 56a of the IGBT 59 extend through the opening 59d of the cooling passage 59 into the third portion 59c. A lower portion of the third portion 59c of the cooling passage 59 is provided with a protrusion 59e that protrudes upward at a position facing the opening 59d of the cooling passage 59.

According to the above configuration, as shown in FIGS. 3, 4, and 5, cooling water is supplied from the radiator 63 to the first portion 59a of the cooling passage 59 via the passage 66. As the cooling water flows from the first portion 59a of the cooling passage 59 to the second portion 59b, the capacitor 55 is cooled.

The cooling water then flows from the second portion 59b of the cooling passage 59 to the third portion 59c, and is brought close to the pin fins 56a of the IGBT 56 by the protrusion 59e of the cooling passage 59, and thus the IGBT 56 is sufficiently cooled.

The cooling water that has flowed over the protrusion 59e of the cooling passage 59 then reaches the position corresponding to the resistor 57, and the resistor 57 is cooled. The cooling water exiting the third portion 59c of the cooling passage 59 returns to the cooling water tank 61 through the passage 67.

First Variation

Instead of providing the first motor generator 21 and the second motor generator 22, one motor generator (not shown) may be provided in the clutch housing 11. According to this configuration, the motor generator need only be provided on the transmission shaft 16.

Second Variation

Instead of storing lubricating oil in the bottom section of the clutch housing 11, an oil tank (not shown; corresponding to a first storage section) for storing lubricating oil may be provided separately from the clutch housing 11.

Third Variation

The injection pump 49 may be omitted, and lubricating oil may be supplied from the injection nozzles 50 to various portions of the first motor generator 21 and various portions of the second motor generator 22.

Fourth Variation

The hydraulic pump 15 and the injection pump 49 may be omitted, and an electric oil pump (not shown; corresponding to a first pump) may be provided along the passage 53 or 54.

According to this configuration, even without providing the injection pump 49, lubricating oil is easily supplied from the injection nozzles 50 to various portions of the first motor generator 21 and various portions of the second motor generator 22.

Fifth Variation

The heat exchanger 60 may extend across the passage 53 and the passage 66.

According to this configuration, the heat exchanger 60 is provided between the oil cooler 48 and the injection pump 49, and is also provided between the radiator 63 and the inverter 45.

The heat exchanger 60 may extend across the passage 54 and the passage 67.

According to this configuration, the heat exchanger 60 is provided between the injection pump 49 and the injection nozzle 50, and is provided between the inverter 45 and the cooling water tank 61.

The heat exchanger 60 may extend across the passage 66 and the passage 51 or 52, or may extend across the passage 67 and the passage 51 or 52.

The heat exchanger 60 may extend across the passage 53 and the passage 64 or 65, or may extend across the passage 53 and the passage 67.

The heat exchanger 60 may extend across the passage 54 and the passage 64 or 65, or may extend across the passage 54 and the passage 66.

Sixth Variation

A case (not shown) that covers the first motor generator 21 (second motor generator 22) may be provided separately from the clutch housing 11, and the first motor generator 21 (second motor generator 22) may be cooled by passing the first coolant through the case.

According to this configuration, cooling water can be used as the first coolant for cooling the first motor generator 21 (second motor generator 22).

In the case where cooling water is used as the first coolant, it is preferable that the heat exchanger 60 extends along the passage 67 and any one of the passages 51 to 54.

In the case where cooling water is used as the first coolant for cooling the first motor generator 21 (second motor generator 22) as described above, cooling water that contains an additive and is different from the first coolant may be used as the second coolant for cooling the inverter 45, such that the first coolant (cooling water) and the second coolant (cooling water) are different from each other.

In this configuration, cooling oil may be used as the second coolant, instead of cooling water.

Seventh Variation

The work vehicle may be an electric tractor having a configuration in which the engine 5 is omitted, and the first motor generator 21 and the second motor generator 22 are replaced with one or more motors (not shown).

According to this configuration, the planetary device 18 and the forward/reverse switching device 19 do not need to be provided in the transmission case 12.

The present invention can be applied not only to a tractor but also to a work vehicle for loading and transporting cargo, a work vehicle for towing a cart or the like, or a work vehicle for construction such as a wheel loader, and can also be applied to a work vehicle equipped with a crawler type of travel device instead of front wheels and rear wheels.

What is claimed is:

1. A work vehicle comprising:
   a travel device;
   a battery;
   a motor configured to supply motive power to the travel device;
   an inverter configured to enable the motor to operate;
   a first storage section configured to store a first coolant; and
   a second storage section configured to store a second coolant, wherein the first coolant in the first storage section is supplied to the motor by a first pump, and returns from the motor to the first storage section,
   the second coolant in the second storage section is supplied to the inverter by a second pump, and returns from the inverter to the second storage section, and
   the first coolant is supplied from an injection nozzle to various portions of the motor and naturally falls from the motor to return to the first storage section.

2. The work vehicle according to claim 1, wherein
   the first coolant is cooling oil, and
   the second coolant is cooling water.

3. The work vehicle according to claim 2, further comprising:
   a cooling section configured to cool the cooling oil in a first supply system in which the cooling oil in the first storage section is supplied from the first pump to the motor; and
   a radiator configured to cool the cooling water in a second supply system in which the cooling water in the second storage section is supplied from the second pump to the inverter.

4. The work vehicle according to claim 3, wherein
   the cooling section includes a heat exchanger extending across the first supply system and the second supply system, and
   the heat exchanger is configured to perform heat exchange between the cooling oil and the cooling water.

5. The work vehicle according to claim 3, wherein
   the cooling section includes an oil cooler configured to cool the cooling oil.

6. The work vehicle according to claim 5, further comprising:
   an electric transmission section housing the motor,
   wherein the first storage section is the electric transmission section, and
   the cooling oil is lubricating oil stored in the electric transmission section.

7. The work vehicle according to claim 6, wherein
   the motor is a motor generator, and
   the work vehicle further comprises:
      an engine separate from the motor generator; and
      a hybrid transmission that includes the electric transmission section and a gear transmission section provided with a gear transmission mechanism, and is configured to change a speed of motive power from the engine and output the motive power to the travel device.

8. The work vehicle according to claim 7, wherein
   the electric transmission section and the gear transmission section are partitioned from each other, and
   the lubricating oil stored in the electric transmission section is different from lubricating oil stored in the gear transmission section.

* * * * *